Figure 1:
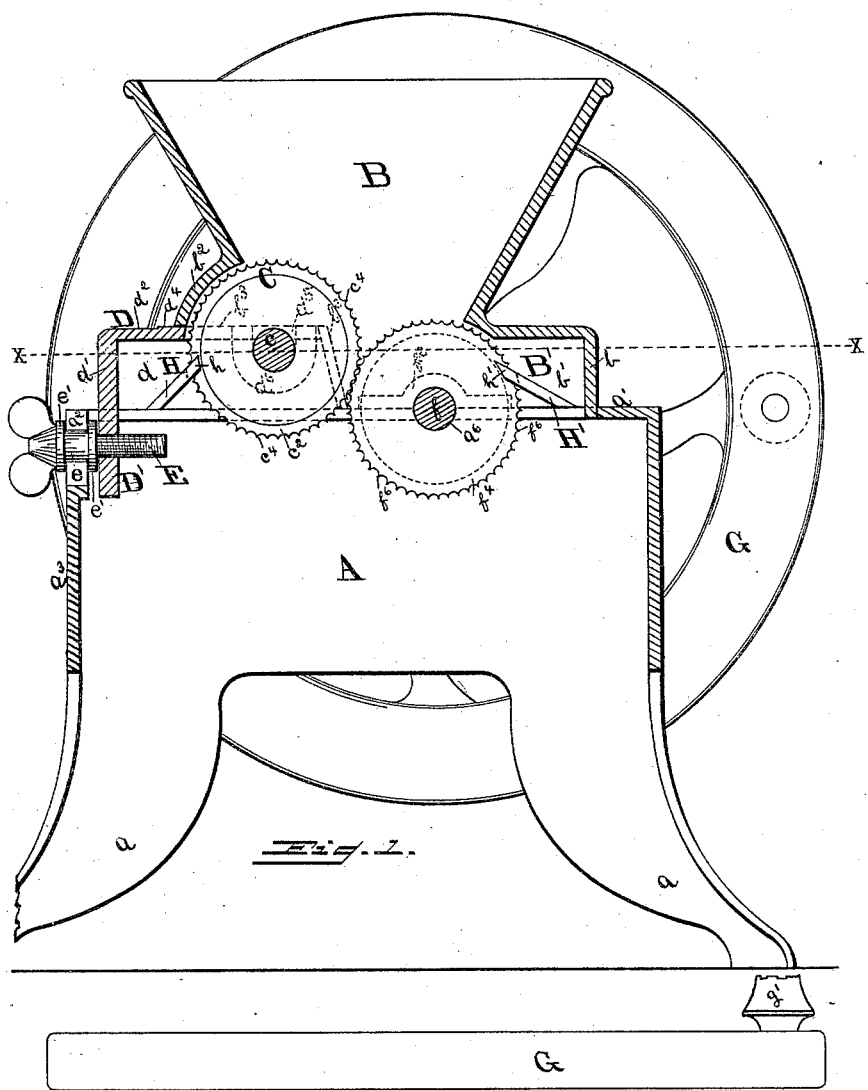

(No Model.) 2 Sheets—Sheet 1.

T. MILLS.
MACHINE FOR GRANULATING NUT KERNELS.

No. 422,818. Patented Mar. 4, 1890.

WITNESSES
George Twiss
Oliver Dirson

INVENTOR
Thomas Mills
By his Attorney,

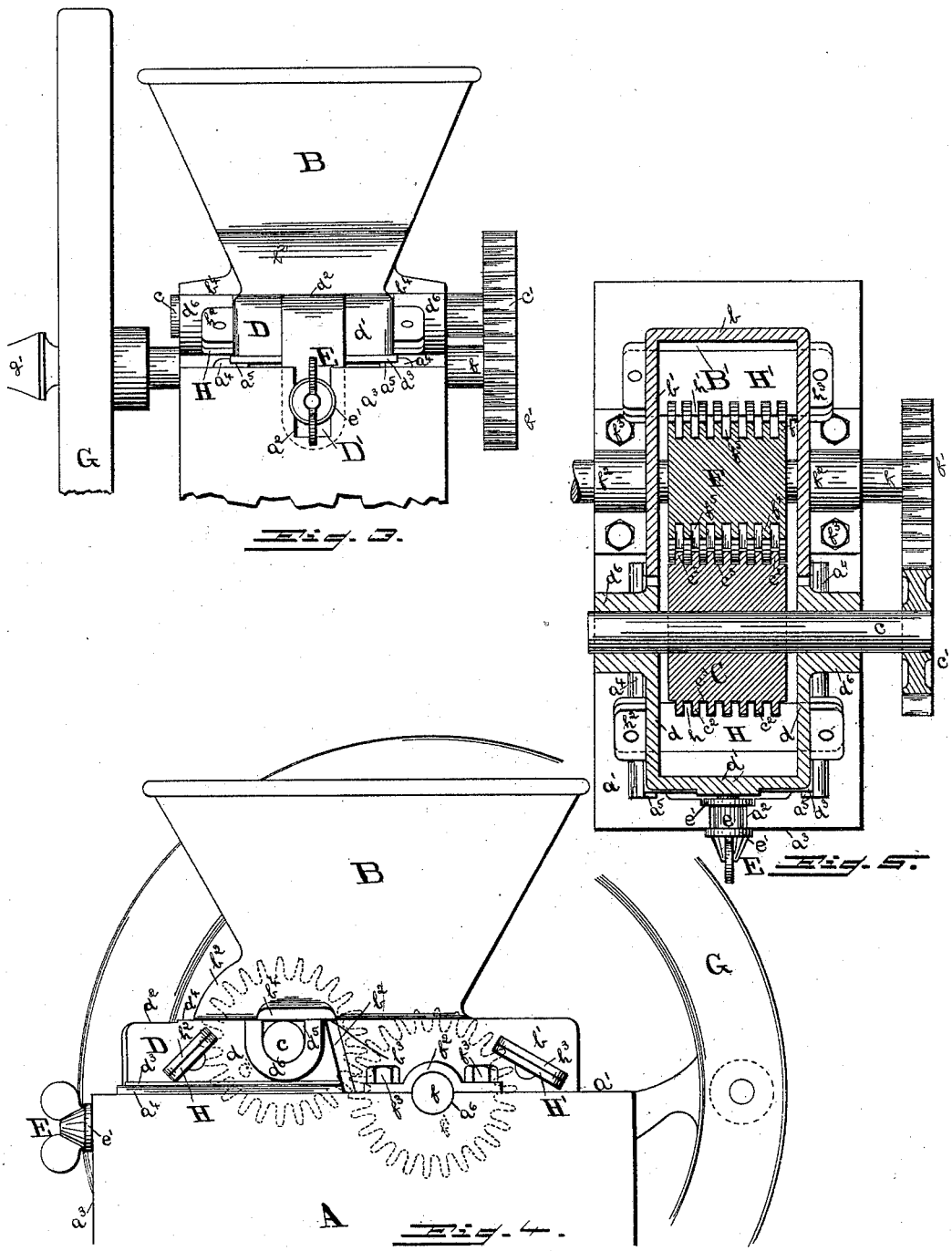

UNITED STATES PATENT OFFICE.

THOMAS MILLS, OF PHILADELPHIA, PENNSYLVANIA.

MACHINE FOR GRANULATING NUT-KERNELS.

SPECIFICATION forming part of Letters Patent No. 422,818, dated March 4, 1890.

Application filed September 20, 1889. Serial No. 324,478. (No model.)

*To all whom it may concern:*

Be it known that I, THOMAS MILLS, a citizen of the United States, and a resident of Philadelphia, in the county of Philadelphia and State of Pennsylvania, have invented certain new and useful Improvements in Machines for Granulating Nut-Kernels; and I do hereby declare that the following is a full, clear, and exact description of the invention.

My invention has relation to machines for the use of confectioners, and has for its object to provide novel, simple, cheap, and efficient means for granulating the kernels of nuts into particles of uniform size after the same have been "blanched" or skinned preparatory to their being made up into confectionery of the desired character.

Heretofore nut-kernels have been granulated in various ways—for instance, by the employment of ordinary knives or chopping-machines similar to meat-choppers. The result of this operation is the division of said kernels into particles of irregular and varying sizes and the production of a great amount of extremely fine particles or dust, which is of little value and very undesirable.

My invention consists in the provision of a pair of oppositely-rotating equally-speeded rollers having on their peripheries a number of intermeshing annular serrated or toothed ribs or flanges, the serrations of one roller coming into close relation with the smooth surfaces of the annular grooves between the ribs on the other roller, and the teeth on said ribs, being sharp and a uniform distance apart, operate to exert a transverse pinching pressure on the nut-kernels, which are fed to the rollers from a suitable hopper, while the teeth on one roller are so arranged relatively to those on the other that their opposing meeting edges operate conjointly to exert a shear-like action on said kernels at angles with the transverse pinching, the result being the breaking off of said kernels wherever pinched and the cutting of the same by the shear action into particles of perfectly uniform size, the dropping of the same into a suitable receiver or pan, and the production of little or no waste whatever. There is also provided a toothed bar or comb for each roller, whose projections extend into the roller-grooves and serve as cleaners for the removal of particles which may remain in said grooves after the pinching operation; also, one of said rollers is sustained in a sliding support, said support being actuated through the medium of a thumb-screw or worm swiveled in the machine-frame and passing through a threaded opening in the sliding support, thus permitting of the varying of the distance between the rollers and the consequent change of the size of the particles by a single operation of said worm.

The details of my invention are more particularly described hereinafter, and will be clearly understood upon referring to the accompanying drawings, wherein—

Figure 2:
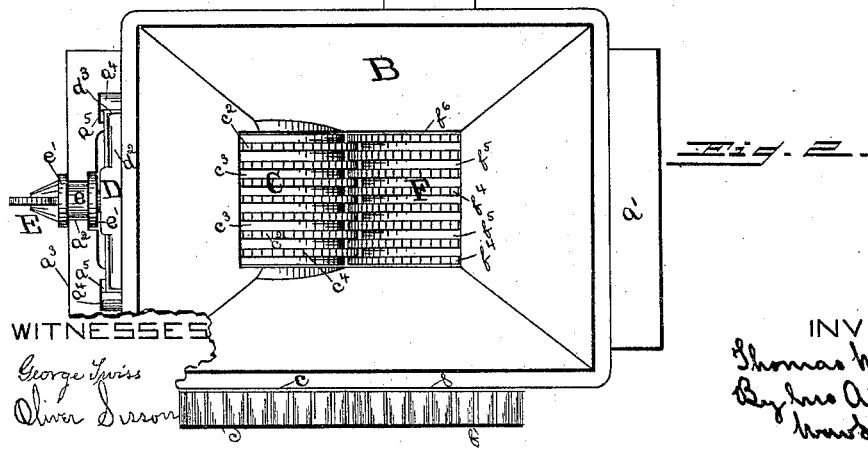

Figure 1 is a vertical section of the machine complete, and Fig. 2 is a plan or top view of the same. Fig. 3 is an end elevation of the upper portion of the machine, and Fig. 4 is a side elevation of the same. Fig. 5 is a transverse section on line $x\,x$ of Fig. 1.

A represents the frame of the machine, provided with legs $a$ and the top $a'$.

B is the hopper, with the chamber B′ below its neck or smallest portion, said chamber being formed by the rearwardly-extending angular wall $b$ and the side walls $b'$, and said hopper is supported on the frame A by said walls being rigidly secured thereto. Hopper B has also an offset $b^2$ adjacent to its neck for affording clearance for the sliding roll C. The side walls $b'$ of the hopper are cut away at $b^2$, so as to allow a clear space between the lower edges $b^3$ of a portion of the hopper-neck and the top $a'$ of the table A. Into this space is slipped the sliding box-like support D for said roller C, said box-like support incidentally forming the other half of the chamber B′, and is formed by the side walls $d$, the end wall $d'$, and the top $d^2$. The wall $d'$ is formed with a depending leg D′, which extends into the space below the top of and inside the frame A, and is threaded for the reception of the correspondingly-threaded thumb-screw or worm E. Said screw is supported in said leg and its shank $e$ loosely rotates in the slot $a^2$ in the front $a^3$ of said frame, and is prevented from moving laterally by the annular flanges $e'$, which bear against the wall of said front.

The lower edges of the walls $d$ of chamber D are enlarged and smoothed or dressed off, as shown at $d^3$, and the upper wall or top $d^2$ is formed with a flattened portion $d^4$, which is also dressed off so as to slide easily in contact with the smooth edges $b^3$ of the hopper-neck.

The front portion of the top $a'$ of the frame A has formed thereon a pair of ribs $a^4$, which have formed in their inner sides angular grooves $a^5$ for the reception of and in which slide the enlarged edges $d^3$. The contact of the edges $b^3$ of the hopper-neck and the flattened portion $d^4$ of the top of the support D serves to prevent the dislodgment of the said support from the ways formed by the ribs $a^4$.

The upper edges of the side walls $d$ of the support D are provided with depressions $d^5$ for the reception of the shaft $c$ of the roller C, and said walls are also formed with U-shaped lateral projections $d^6$, which are contiguous to and follow the contour of the depressions $d^5$ and afford an extended bearing for the shaft $c$, which shaft is secured against dislodgment from said depressions by the laterally-projecting ears or lugs $b^4$, formed on each side of the hopper-neck and in such positions as to project over the depressions $d^5$ and the shaft $c$. Said shaft $c$ has secured thereon at one end the gear-wheel $c'$, which, as shown in dotted lines, has rather long teeth, so as to prevent the disengagement of said gear-wheel with the corresponding gear-wheel $f'$ on the end of the shaft $f$ of the roller F, when the roller C is slid to its fullest extent away from said roller F. The shaft $f$ is journaled in the depressions $a^6$ in the top of the frame A, and is secured therein by the straps $f^2$, which are secured to said frame-top by the bolts $f^3$. The end of shaft $f$ opposite the gear-wheel end has secured thereon a driving-wheel G, with a handle $g'$ thereon for its manual operation, although, as is quite obvious, the successful operation of my invention will not be impaired by the use of other power.

$c^2$ represents the annular ribs, seven in number, on the periphery of the roller C, said ribs being of such distance apart as to leave annular grooves $c^3$ of slightly larger breadth than the width of said ribs. The walls and bottoms of these grooves are perfectly smooth and at right angles with each other.

$f^4$ represents the annular ribs and $f^5$ the annular grooves of the roller F, both of which are exactly the same in all respects as those of the roller C, and said rollers are so placed relatively to each other that the ribs of one, with their sharp teeth, will project into the grooves of the other, the effect being an intermeshing. The peripheries of these ribs are, as above suggested, provided with sharp teeth $c^4$ $f^6$, with intermediate depressions, forming a serrated edge for each rib, such serrations being opposed to the smooth surfaces of the grooves between said ribs, and the straight sides of the teeth on one roll as they pass such sides of the teeth on the other roll operate conjointly to produce a substantially shear-like action.

In order that none of the particles of the kernels shall remain in the grooves after the pinching operation, I provide a comb H for the roller C, and a similar comb H' for the roller F. The angles of inclination of these combs are shown as being unlike, which is not for any particular reason, excepting as a matter of convenience, as said rollers are not in horizontal alignment, which disalignment enables the teeth of the higher roll to force the kernels with greater facility into the jaws than if the same were in a horizontal plane with each other. These combs have teeth or projections $h$ $h'$ therein, which fill the spaces between the roller-ribs and prevent the passage of any particles past the combs which may remain in the grooves. The ends of said combs pass through slits in the walls $b'$ and $d$, and are screwed to lugs $h^2$ $h^3$, formed on the outside of said walls. Thus said combs are sustained in their proper positions.

I have shown the rollers as being adjusted to their farthest distance apart; but their positions when adjusted into their closest relation can readily be imagined without further illustration.

It may be found desirable in some cases to dispense with the adjustability of the rollers and support both rigidly after the manner of the roller F, in which case there would be no departure from the spirit of my invention.

The operation is as follows: After the nut-kernels have been placed in the hopper B, the wheel G is rotated toward the left of the drawings, and the motion of the shaft $f$, carrying the roller F, will be communicated to the shaft $c$ through gear-wheels $f'$ $c'$. The direction of rotation of the roller C is of course opposite to that of roller F. The result of this operation is the cutting of the kernels into strips by the shear action described and the breaking of the strips transversely into particles of uniform size without any waste by the mere pinching or scarring of the surfaces of said kernels by the sharp teeth on the annular ribs opposed to the bottoms of the grooves. The adjustment of the rollers is accomplished at the discretion of the operator, and according as the coarseness or fineness of the particles is necessitated, by the turning of the screw E in either direction, and the motion being communicated to the sliding support for the roller C, said support sliding on the ways formed by the angular recesses or grooves in the ribs $a^4$ and the flat edges $b^3$ of the hopper-neck.

It may be found desirable to provide the rollers with a greater number of ribs than as herein described, which desire can readily be gratified without invention.

Having fully described my invention, what I claim as new, and desire to secure by Letters Patent, is—

1. In a machine for granulating nut-kernels, the combination of a pair of cutting-rolls mounted in different horizontal planes, each roll being provided with a series of annular cutting-ribs, the ribs being serrated, so as to form on each rib a series of sharp radial cutting-points, the said ribs being separated from each other by a series of grooves which are of substantially the same width as the cutting-ribs, the rolls being arranged so that the ribs of one roll project into the grooves of the other roll, whereby a shearing cut is obtained by the action of the overlapping ribs of the respective rolls, means for rotating the rolls at the same speed in different directions, means for adjusting the rolls with respect to each other, and means for the introduction of nut-kernels to the rolls, all substantially as and for the purpose described.

2. In a machine for granulating nut-kernels, the combination of a pair of oppositely-rotating equally-speeded rollers having intermeshing peripheral annular toothed ribs and grooves of approximately equal widths, a sliding support D for one of said rollers, the leg D′, integral with or secured to said support, the thumb-screw E, swiveled in the frame of the machine, a threaded opening in said leg for the reception of said screw, and a superposed hopper for the kernels, substantially as shown and described.

3. In a machine for granulating nut-kernels, the combination of the roller F, provided with the ribs $f^4$ and the grooves $f^5$, and journaled in the machine-frame, the roller C, provided with the ribs $c^2$ and the grooves $c^3$ and journaled in the support D, the comb H, secured in said support, and the comb H′, secured in said frame, their teeth $h$ $h'$ projecting into the grooves of said rollers, the leg D′, integral with the support D, said support sliding on the machine-frame, the screw E, swiveled in the latter, a threaded opening in the leg for the reception of the screw, means for operating the rollers, and a superposed hopper for the kernels, substantially as shown and described.

4. In a machine for granulating nut-kernels, the combination of the frame A, the hopper B, the roller F, the ribs $f^4$, the grooves $f^5$, the straps $f^2$, the roller C, the ribs $c^2$, the grooves $c^3$, the shafts $c$ $f$, the gears $c'$ $f'$, the support D, the depressions $a^6$ $d^5$, the projections $d^6$, the lugs $b^4$, the leg D′, the screw E, the slot $a^2$, the ribs $a^4$, the recesses $a^5$, the enlargements $d^3$, the flat portion $d^4$, the edge $b^3$, the combs H H′, the lugs $h^2$ $h^3$, and the driving-wheel G, substantially as shown and described.

In testimony that I claim the foregoing I have hereunto set my hand this 18th day of September, A. D. 1889.

THOMAS MILLS.

Witnesses:
WM. H. POWELL,
R. DALE SPARHAWK.